(12) United States Patent
Mullen (10) Patent No.: US 8,727,219 B1
(45) Date of Patent: May 20, 2014

(54) MAGNETIC STRIPE TRACK SIGNAL HAVING MULTIPLE COMMUNICATIONS CHANNELS

(75) Inventor: Jeffrey D. Mullen, Pittsburgh, PA (US)

(73) Assignee: Dynamics Inc., Pittsburgh, PA (US)

( * ) Notice: Subject to any disclaimer, the term of this patent is extended or adjusted under 35 U.S.C. 154(b) by 228 days.

(21) Appl. No.: 12/902,254

(22) Filed: Oct. 12, 2010

Related U.S. Application Data (60) Provisional application No. 61/250,636, filed on Oct. 12, 2009.

(51) Int. Cl.
| | | |
|---|---|---|
| G06K 7/08 | (2006.01) | |
| G06K 5/00 | (2006.01) | |
| G06K 7/00 | (2006.01) | |
| G06K 19/00 | (2006.01) | |

(52) U.S. Cl.
USPC ........... 235/449; 235/380; 235/435; 235/439; 235/487

(58) Field of Classification Search
USPC .......... 235/379–381, 449, 487, 492, 435, 439
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman et al. |
| 5,479,512 A | 12/1995 | Weiss |
| 5,484,997 A | 1/1996 | Haynes |
| 5,485,519 A | 1/1996 | Weiss |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Thien M Le
*Assistant Examiner* — April Taylor (57) ABSTRACT

An electronic card (e.g., an electronic payment card) or another device (e.g., a wireless telephonic device) is provided that may communicate dynamic magnetic stripe data to a magnetic stripe reader. Information may be embedded into a magnetic track of data representative of additional information such as, for example, a unique identification number or an additional track of magnetic stripe data.

20 Claims, 6 Drawing Sheets

(56) References Cited

U.S. PATENT DOCUMENTS

| | | |
|---|---|---|
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moulette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 7,954,724 B2 * | 6/2011 | Poidomani et al. ........... 235/492 |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0042307 A1 * | 3/2003 | Prow et al. .................... 235/449 |
| 2003/0052168 A1 | 3/2003 | Wong |
| 2003/0057278 A1 | 3/2003 | Wong |
| 2003/0116635 A1 | 6/2003 | Taban |
| 2003/0117734 A1 * | 6/2003 | Yokozawa et al. ................ 360/2 |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |

(56) References Cited

U.S. PATENT DOCUMENTS

| | | |
|---|---|---|
| 2006/0041759 A1 | 2/2006 | Kaliski et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0136211 A1* | 6/2007 | Brown et al. .................. 705/75 |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159708 A1* | 6/2009 | Mullen et al. .................. 235/493 |
| 2009/0159713 A1* | 6/2009 | Mullen et al. .................. 235/493 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0084476 A1* | 4/2010 | Zellner et al. .................. 235/492 |
| 2011/0028184 A1 | 2/2011 | Cooper |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

MAGNETIC STRIPE TRACK SIGNAL HAVING MULTIPLE COMMUNICATIONS CHANNELS

CROSS-REFERENCE TO RELATED APPLICATION

This application claims the benefit of U.S. Provisional Patent Application No. 61/250,636, titled "Magnetic Stripe Track Signal Having Multiple Communications Channels," filed Oct. 12, 2009, which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A magnetic stripe reader is provided that is operable to extract bit information from flux transversals. Such a magnetic stripe reader may do so, for example, by utilizing frequency/double-frequency decoding of a signal provided by a magnetic stripe. The reader may extract additional information from such a magnetic stripe signal. For example, the reader may utilize differences in magnitude of flux transversals to discern additional data. Accordingly, a card may include a dynamic magnetic stripe communications device operable to communicate magnetic stripe data by communicating data through a frequency/double-frequency encoding scheme and also by changing the magnitude of such a signal to various levels for particular flux transversals of the signal. Additional data may be provided in such a signal (e.g., a magnetic stripe track signal). For example, the slope that a particular signal increases and decreases may be controlled by a dynamic magnetic stripe communications device such that, for example, a magnetic stripe reader operable to discern such varying slopes as particular data may be operable to extract such varying slopes as particular data. In this manner, a magnetic stripe reader is provided that is operable to discern data from a magnetic stripe signal other than just the timing between flux transversals and use this discerned data as additional information. Similarly, an electronic payment card is provided that is operable to communicate a stream of magnetic data with embedded information.

A remote facility is provided that is operable to receive an enhanced data packet from a magnetic stripe reader and utilize this additional data to perform additional functions. Particularly, the remote facility may receive data indicative of a magnetic stripe track as well as data representative of additional, embedded information. Such a remote facility may receive, for example, information and embedded information from multiple tracks (e.g., two or three tracks).

A magnetic stripe reader is provided that is operable to extract information from characteristics of a magnetic stripe signal in addition to the timing between flux transversals. For example, a magnetic stripe reader may determine levels of the amplitude of magnetic-based signals at particular data points (e.g., the $10^{th}$ bit of data) and utilize this additional information to discern an additional bit of information. The reader may then send such additional information from a stripe signal to a remote server in addition to the information extracted from the timing of the flux transversals themselves. This additional information may be utilized, for example, to verify the authenticity of a card for a particular account number (e.g., a card-controlled "signature" for the stripe), to transmit information associated with the status of the card (e.g., voltage of a battery or tamper status of tamper detecting hardware/software), to transmit information associated with the card's environment (e.g., the number of swipes of a card in a predetermined time such as the 60 seconds prior to data transmission), or to transmit any additional information (e.g., a second or a second and third magnetic stripe track of data). Accordingly, for example, a single track of magnetic stripe data may include enough embedded information to provide a total of three tracks of magnetic stripe data.

A dynamic magnetic stripe reader communications device is provided. Such a communications device may take the form of a magnetic encoder operable to write data to a magnetic medium. Such a communications device may take the form of a magnetic emulator operable to transmit data directly to a read-head of a read-head housing of a magnetic stripe reader without the presence of a magnetic stripe.

A magnetic stripe may be provided over a magnetic emulator. A magnetic stripe may include a magnetic signature. A reader may determine the magnetic signature from this magnetic stripe by reading, for example, variations in amplitude of magnetic-based signals at particular data points/ranges. The reader may then communicate an additional field of data with a number corresponding to this signature. A remote server may, for example, check an account number transmitted in the base information to determine whether the card is in a registry of cards that opted-in for signature authentication and, if so, the remote server may check the value of the extended data to determine whether it is in a range of values stored for that particular card. If so, the transaction may be verified. If not, the transaction may be refused.

A magnetic stripe emulator may be provided without a magnetic stripe. A magnetic stripe emulator may include one or more coils that correspond to one or more tracks of data. Accordingly, three coils may be provided to send a separate track of data to a separate read-head of a single read-head housing. A processor of a card may, for example, determine additional information to communicate (e.g., a dynamic signature or additional information). The processor may change the amount of current provided through a particular coil at a particular time (e.g., when a particular bit is being transmitted) such that additional data is communicated to the reader. For example, a reader may look at the amplitude of received signals for particular bits (or groups of bits) and discern information depending on the amplitude received. For example, a bit may be discerned from a determination that a particular part of the signal is HI or LOW. More information may be discerned from a determination that a particular part of the signal is HI, MEDIUM, or LOW.

Information may also be transmitted, for example, by comparing characteristics of different tracks to each other. For example, two coils may be provided. If the processor communicates each track at the same frequency, then one bit of information may be discerned. If the processor communicates each track at different frequencies, then another bit of information may be discerned. Accordingly, a track of information may be utilized as a base frequency and the frequencies of the other tracks, compared to this base track, may be utilized to discern additional information. For example, if twenty frequencies can be discerned by a reader then, for example, twenty additional states of information may be discerned by the reader if two tracks are communicated.

Such techniques may allow, for example, for one track of data to be embedded into another track of data without extending the length of that other track of data. For example, track 2 data may be embedded into track 1 data. In doing so, a multi-track signal may be provided within a single track. Accordingly, a magnetic stripe emulator may be provided that is operable to wirelessly communicate a track of magnetic stripe data to a reader. Accordingly, a remote server may receive a track of base data with an extended data field and utilize this extended data field as an additional track of data. Accordingly, the remote server may parse the second track of data and send portions of that track of data to different remote servers (e.g., one portion may be communicated to a remote processing facility controlled by a card association and another portion may be communicated to a remote processing facility controlled by a card issuer). Accordingly, embedding information into a magnetic stripe track signal may, for example, allow additional information to be communicated without extending the length of the magnetic stripe track signal.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
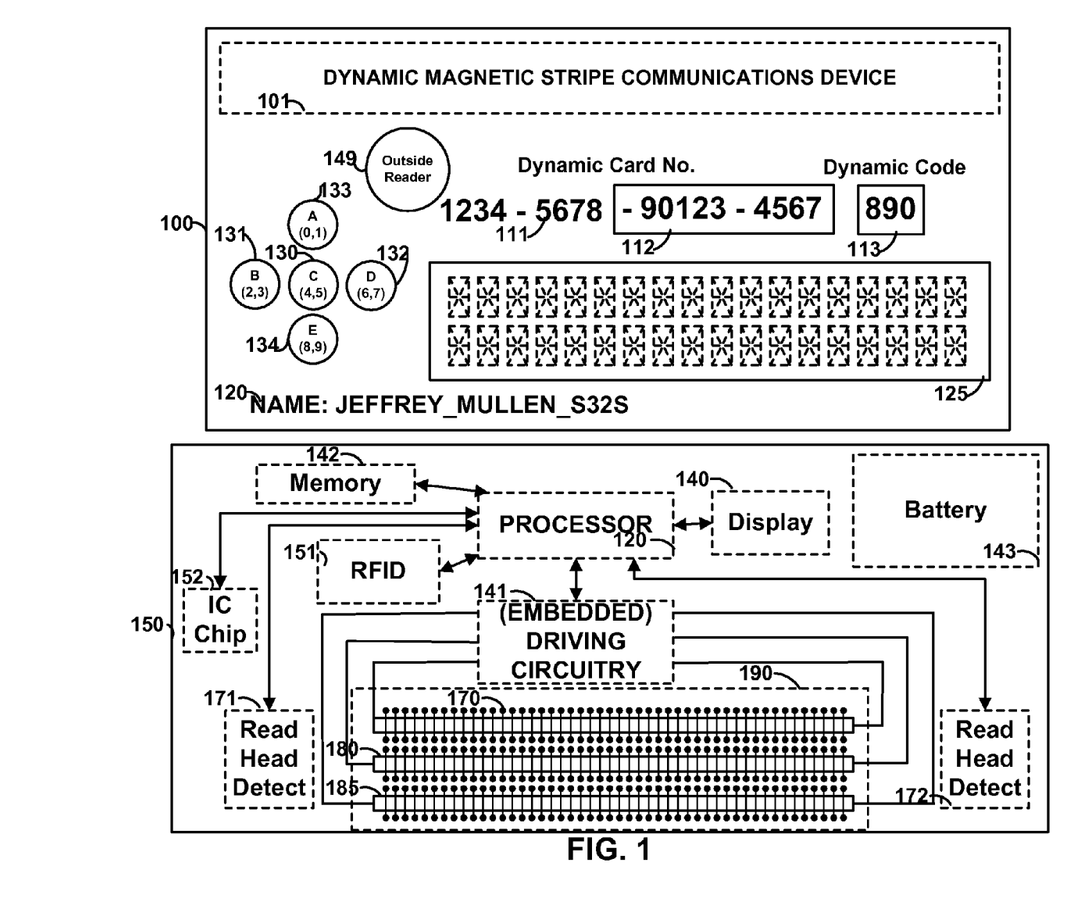
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination of mechanical and capacitive buttons. Card 100 may include button 149. Button 149 may be used, for example, to place card 100 into a programming mode to receive programming (e.g., programming of a user's personal payment card data). A button (e.g., button 149) may be utilized in a variety of ways (e.g., to communicate information through a dynamic magnetic communications device indicative of a user's intent to purchase a particular product with points instead of credit). Button 149 may be provided to, for example, instruct the card to communicate data in a form desired for a wireless transmission through the casing of a magnetic stripe reader instead of, for example, a swiping of the card past a magnetic stripe reader read-head housing. In doing so, for example, multiple tracks of information (e.g., one or two tracks of information) may be embedded into a different track that is communicated. In doing so, for example, a single read-head of a read-head housing may receive the magnetic track signal having embedded information representative of additional magnetic stripe tracks, discern these different tracks, and communicate these different tracks to a remote facility.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may store discretionary data codes associated with buttons of card 150. Such codes may be recognized by remote servers to effect particular actions. For example, a code may be stored on memory 142 that causes a non-merchant product to be purchased with points during a merchant transaction. Memory 142 may store, for example, data to be embedded into a magnetic stripe track signal.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185. Driver circuitry 141 may change characteristics of a magnetic stripe track in order to embed additional information into that track. Similarly, for example, driver circuitry 141 may change characteristics of two, or more, magnetic stripe tracks in order to embed information between characteristics of such magnetic stripe tracks.

Figure 2:
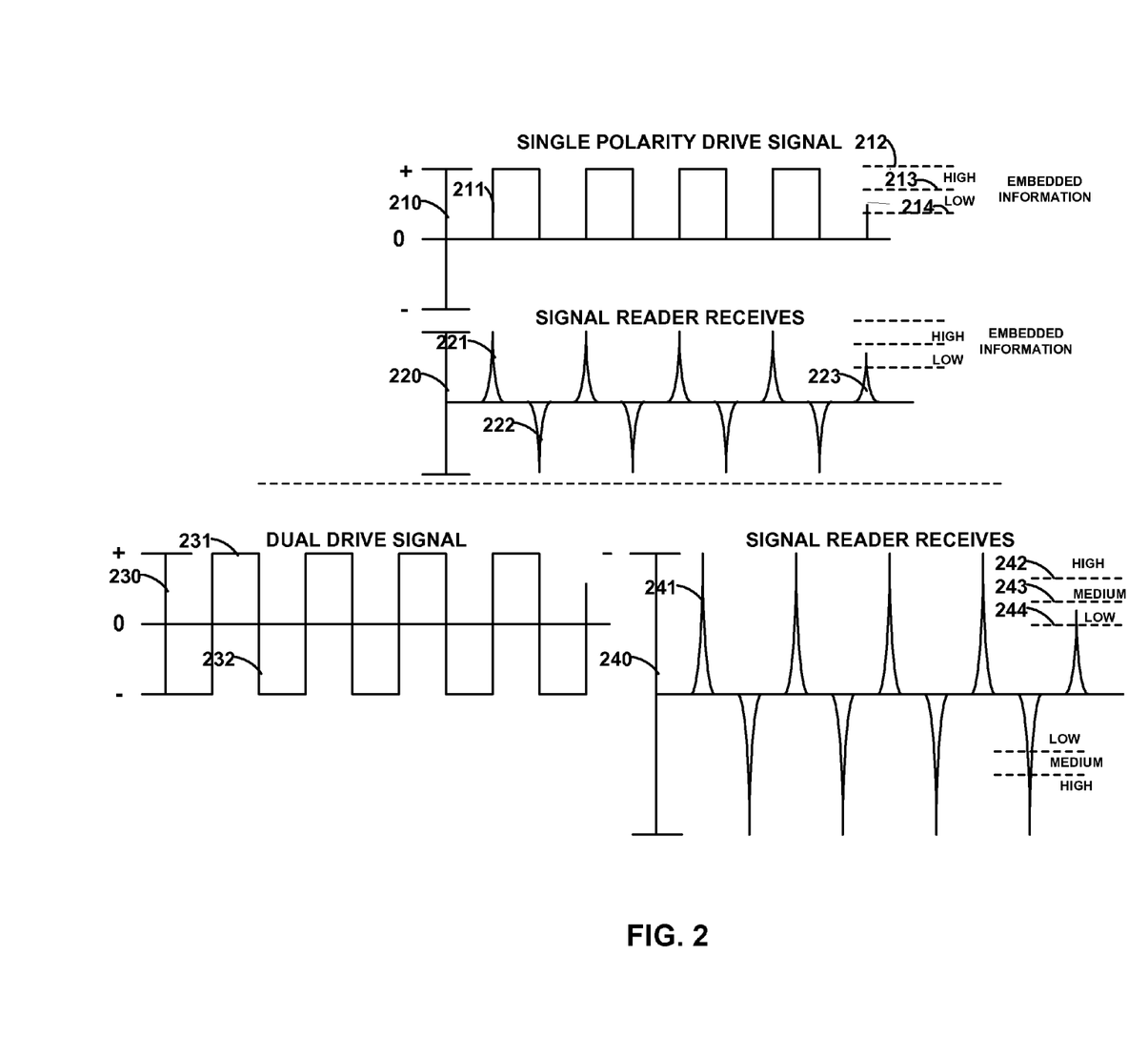
FIG. 2 is an illustration of communication signals constructed in accordance with the principles of the present invention.

FIG. 2 shows signal 210 that may include signal segment 211. A magnetic emulator may, for example, be driven to produce flux transversals operable to be read by a magnetic stripe reader. The magnitude of the signal may, for example, be controlled. Particularly, the magnitude of a signal may be provided between thresholds 212 and 213 to embed one particular information and the magnitude of that signal may be provided between thresholds 213 and 214 to embed different information. Accordingly, for example, a HIGH state and a LOW state may be provided by a dynamic magnetic stripe communications device (e.g., a magnetic emulator) and this HIGH and LOW state may be discerned by a magnetic stripe reader and utilized to communicate additional information. Persons skilled in the art will appreciate that the magnitude of current provided through, for example, a coil of a magnetic emulator may be indicative of the magnitude of the electromagnetic signal provided by that coil.

Signal 220 may also be provided that includes signal segments 221 and 222. A magnetic stripe reader may, for example, receive flux transversals as segments 221 and 222. Signal 210 may be provided at a single polarity. Signal 220 may also be included that includes signal segment 221. For example, segment 221 may be obtained as a result of an increase of signal 210. Signal segment 222 may be obtained as the result of a decrease of signal 210. Signal segment 223 may have, for example, a lower magnitude than signal segment 221 and, as a result, additional information may be communicated through this difference in magnitude.

Persons skilled in the art will appreciate that cards may be pre-set with different magnitudes to communicate different portions of one or more tracks of magnetic stripe data. Such presets may be unique for each card. In doing so, for example, the identity of a card may be obtained regardless of the information that is communicated.

Signal 230 may be provided. Signal 230 may be, for example, a dual polarity drive signal for driving, for example, a magnetic emulator. Segments 231 and 232 may be provided on signal 230. A read-head of a magnetic stripe reader may receive signal 240 from a magnetic emulator driven via signal 230. Accordingly, segment 241 may be provided. Thresholds 242, 243, and 244 may be utilized, for example, to extract additional information from a signal (e.g., a magnetic stripe track signal). For example, thresholds 242, 243, and 244 may be utilized to define LOW, MEDIUM, and HIGH states, where each state may represent different information. For signal segments of the opposite polarity, similar thresholds may be provided to provide additional states of LOW, MEDIUM, and HIGH. Persons skilled in the art will appreciate that any number of thresholds may be utilized to provide any number of states.

Figure 3:
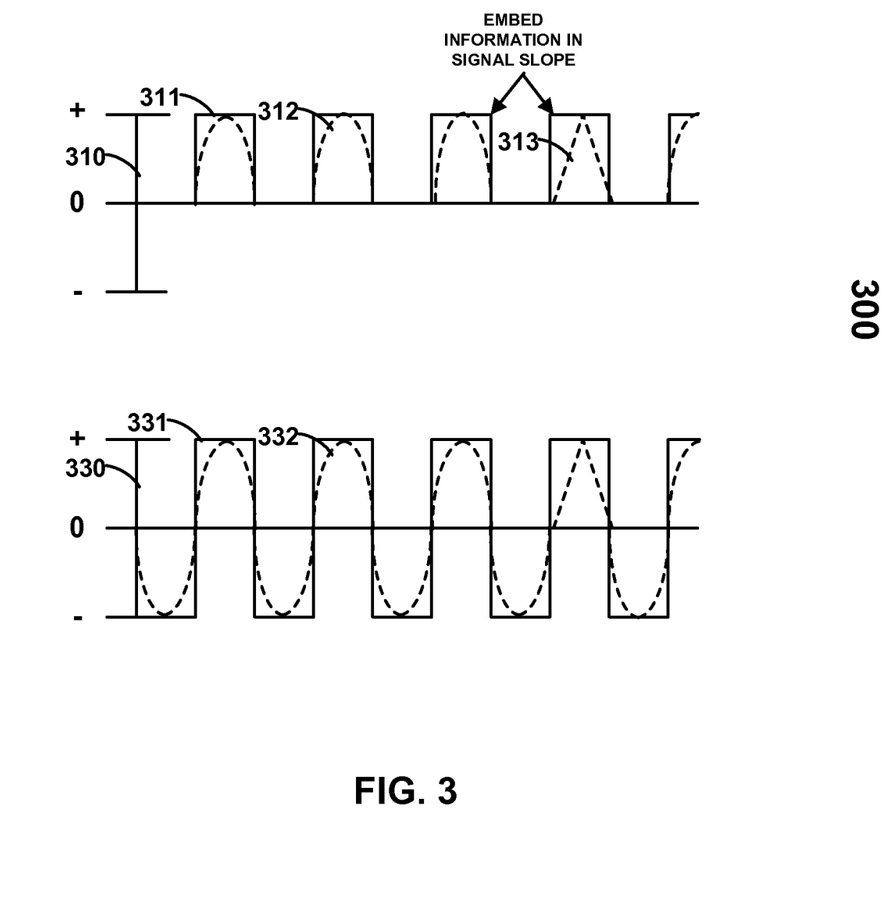
FIG. 3 is an illustration of communication signals constructed in accordance with the principles of the present invention.

FIG. 3 shows signal 310 having signal segment 311. Persons skilled in the art will appreciate that the slope of a signal may be changed. For example, the slope of a signal may be changed from a discrete change to a non-linear slope (e.g., slope 312) on one or more sides of a pulse or a linear slope (e.g., slope 313) on one or more sides of a pulse (or a combination). Such differences in slopes may be determined by a reader and, for example, utilized by the reader to extract additional bits of information. Signal 330 shows signal 331 that also may utilize varying slopes (e.g., slope 332) to embed additional information into an information signal such as a magnetic stripe track signal communicated in a frequency/double-frequency encoding scheme (e.g., F2F encoding).

Figure 4:
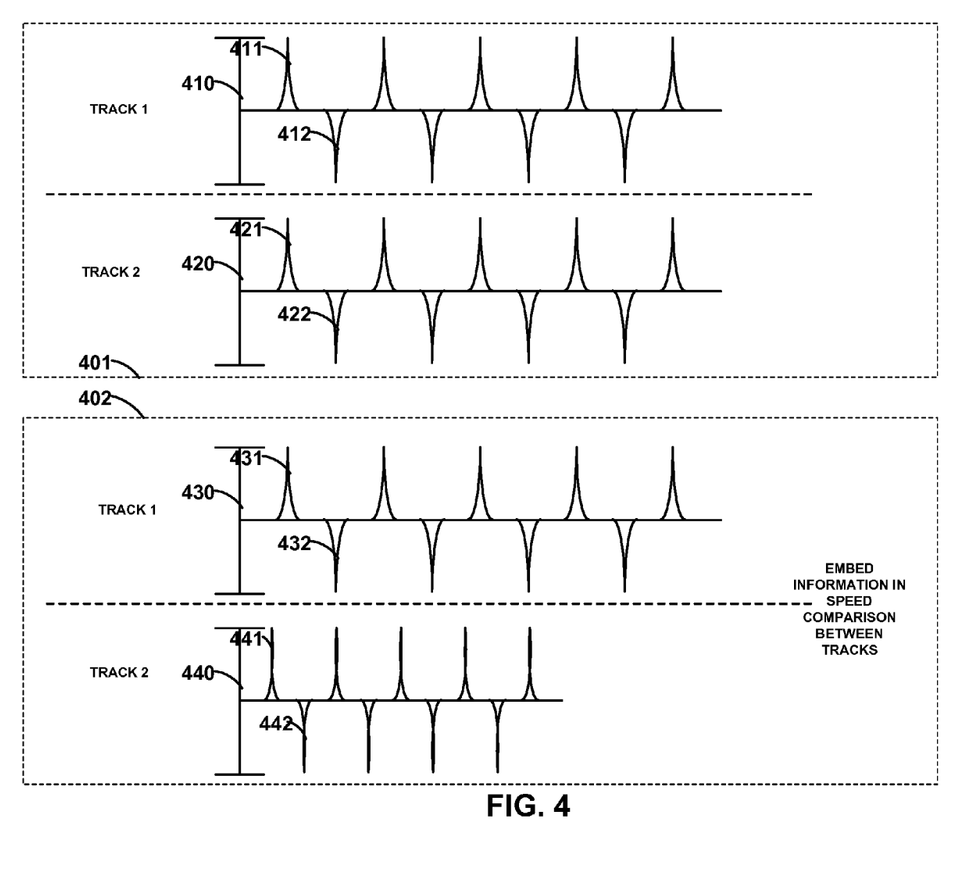
FIG. 4 is an illustration of communication signals constructed in accordance with the principles of the present invention.

FIG. 4 shows magnetic stripe data 401 as being read by a magnetic stripe reader having multiple read-heads receiving magnetic stripe track data. As shown, the received data includes magnetic stripe track data 410 and magnetic stripe track data 420. Data may be embedded by changing characteristics of one track data with respect to the other track data. For example, a dynamic magnetic stripe communications device may introduce a delay between when two track signals are communicated. This delay, for example, may be utilized to communicate additional information. Such delays may be included in each pulse of information so that a magnetic stripe reader may notice the delays to extract additional information, but which may be transparent to a frequency/double frequency (e.g., F2F) encoding scheme. Magnetic stripe signal 402 shows additional data being read by a magnetic stripe reader. The additional data can include magnetic stripe track signal 430 and 440. Segments 431 and 432 may be included in signal 430. Segments 441 and 442 may be included in signal 440. Information may be embedded, for example, by changing the overall speed that one track is communicated with respect to the other track.

Figure 5:
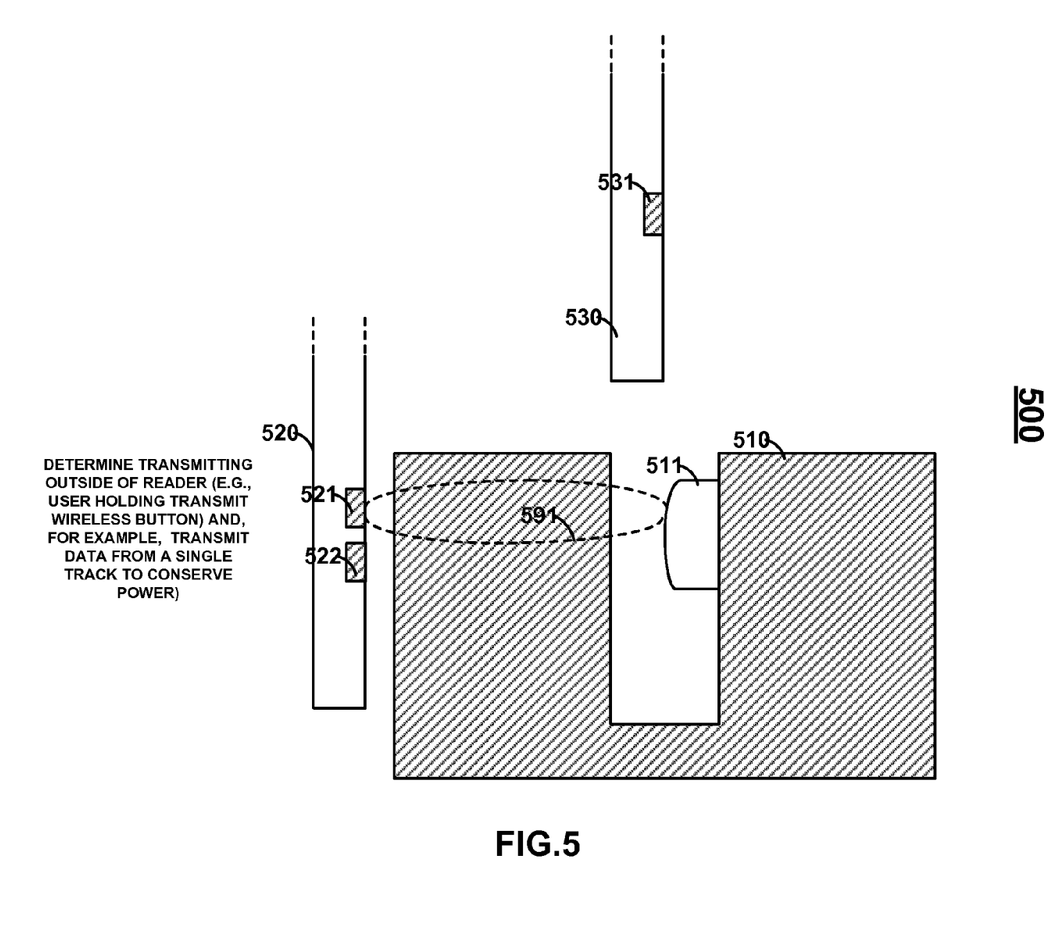
FIG. 5 is an illustration of a magnetic stripe reader and card constructed in accordance with the principles of the present invention.

FIG. 5 shows topology 500. Card 530 may include a dynamic magnetic stripe communications device for communicating one or more tracks of magnetic stripe data to a read-head (e.g., read-head 511) of a magnetic stripe reader (e.g., magnetic stripe reader 510). Card 520 may include magnetic stripe communications device 521 and 522. Device 521 may communicate information via, for example, electromagnetic signal 591. Persons skilled in the art will appreciate that card 520 may determine whether to communicate information outside or inside a reader via, for example, a manual button. Device 521 may, for example, communicate a single track of data if card 520 is swiped. However, device 520 may communicate multiple tracks of information (e.g., one track embedded in another track) if the card is desired to communicate outside of a reader. Device 520 may be included in a wireless telephonic device.

Figure 6:
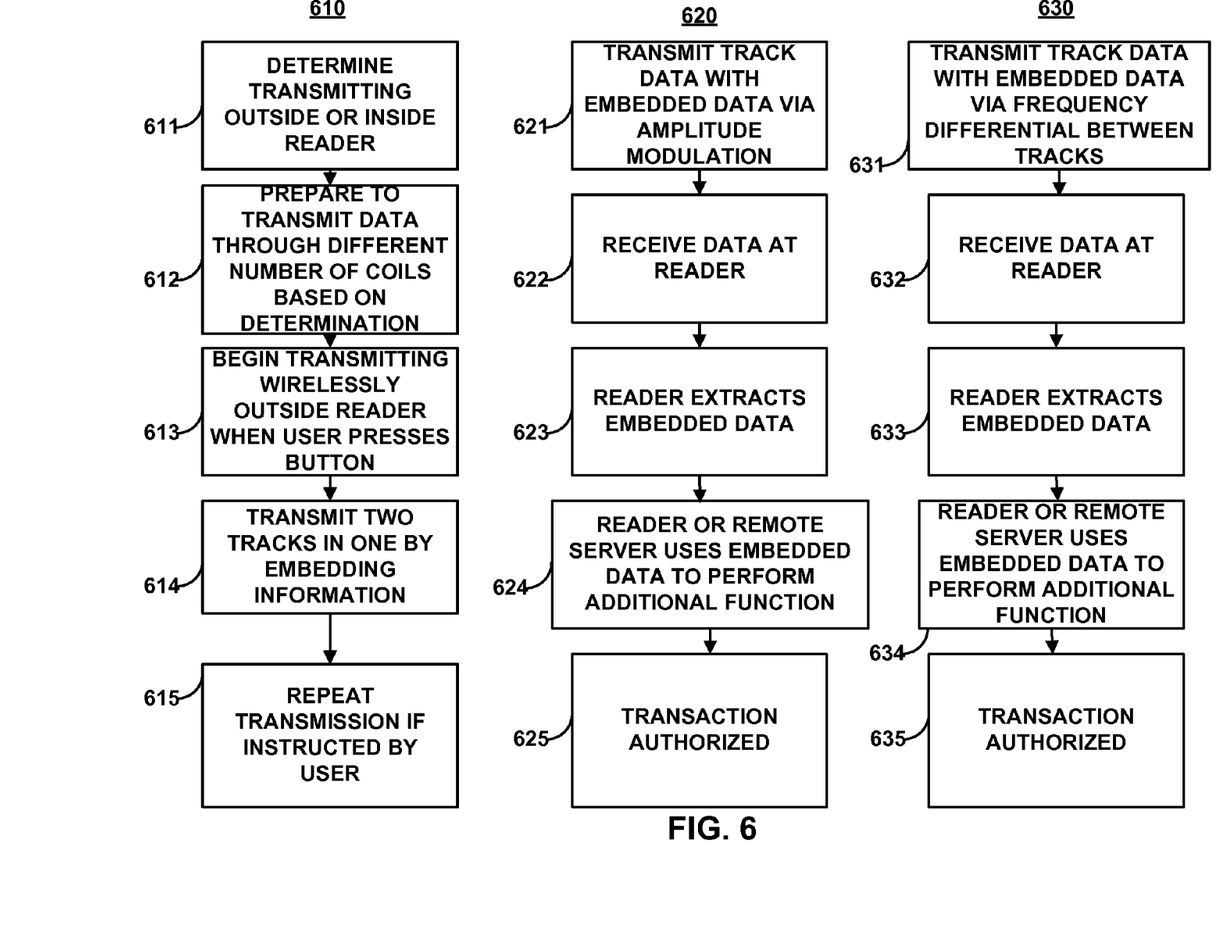
FIG. 6 is an illustration of processes constructed in accordance with the principles of the present invention.

FIG. 6 shows flow charts 610, 620, and 630. Flow chart 610 includes step 611, in which a determination is made as to whether a magnetic stripe transmission is desired to be communicated outside or inside of a reader. Step 612 may be included, in which data is prepared to be transmitted through one or more coils based on the determination of step 611. In step 613, data may be communicated wirelessly, while the card is positioned outside of a reader, when a button is pressed on the card. Step 614 may be provided, in which multiple tracks (e.g., two) are communicated in a single track via embedded information into a magnetic stripe track signal. The transmission may be repeated, for example, in step 615.

Flow chart 620 may be provided that may include step 621, in which data may be communicated with data embedded in the amplitude of the signal. Such data may be received at a reader in step 622 and the embedded data may be extracted in step 623. The extracted embedded data may be utilized to perform an additional function in step 624 and the transaction may be authorized in step 625.

Flow chart 630 may be provided and may include step 631, in which data may be embedded into track data via frequency differentials between tracks (e.g., speed differentials between tracks). Step 632 may be provided in which data is received at a reader. The reader may extract embedded data in step 633 and this data may be utilized to perform additional functions in step 634. A transaction may be authorized in step 635.

Persons skilled in the art will also appreciate that the present invention is not limited to only the embodiments described. Instead, the present invention more generally involves dynamic information. Persons skilled in the art will also appreciate that the apparatus of the present invention may be implemented in other ways than those described herein. All such modifications are within the scope of the present invention, which is limited only by the claims that follow.

What is claimed is:

1. A card comprising:
a battery;
a processor; and
a dynamic magnetic stripe communications device,
wherein said card is operable to communicate first magnetic stripe track data via frequency/double-frequency F2F encoding and is operable to communicate additional data embedded in said first magnetic stripe track data as amplitude modifications to said first magnetic stripe track data, said amplitude modifications being associated with a plurality of data states.

2. The card of claim 1, wherein said additional data includes second magnetic stripe track data, said first magnetic stripe track data being data of a different track from said second magnetic stripe track data.

3. A wireless telephonic device comprising the card of claim 1.

4. A card comprising:
a battery;
a processor; and
a dynamic magnetic stripe communications device,
wherein said card is operable to communicate first magnetic stripe track data via frequency/double-frequency F2F encoding, is operable to communicate additional data embedded in said first magnetic stripe track data as amplitude modifications to said first magnetic stripe track data, and is operable to communicate a HIGH state and a LOW state discernible by a magnetic stripe reader based on said amplitude modifications.

5. A card comprising:
a battery;
a processor; and
a dynamic magnetic stripe communications device,
wherein said card is operable to communicate first magnetic stripe track data via frequency/double-frequency F2F encoding,
said card is operable to communicate additional data embedded in said first magnetic stripe track data as amplitude modifications to said first magnetic stripe track data,
said card is operable to communicate a plurality of data states, and
each of said plurality of data states is based on a current magnitude.

6. A card comprising:
a battery;
a processor; and
a dynamic magnetic stripe communications device,
wherein said card is operable to communicate first magnetic stripe track data via frequency/double-frequency F2F encoding,
said card is operable to communicate additional data embedded in said first magnetic stripe track data as amplitude modifications to said first magnetic stripe track data,
said dynamic stripe communications device includes at least one coil,
said amplitude modifications are associated with a plurality of data states, and
each of said plurality of data states is based on a current magnitude of current in said at least one coil.

7. A card, comprising:
a battery;
a processor; and
a dynamic magnetic stripe communications device,
wherein the card is operable to communicate a variable magnitude electromagnetic signal including flux transversals,
at least a plurality of the flux transversals are associated with first data,
at least a plurality of magnitudes of the electromagnetic signal are associated with second data,
the card is operable to vary a magnitude of the electromagnetic signal between the plurality of magnitudes, and
the plurality of magnitudes correspond to a plurality of different data states.

8. The card of claim 7, wherein the first data is magnetic stripe track data and the second data is embedded in the magnetic stripe track data.

9. The card of claim 7, wherein the electromagnetic signal is a single polarity signal.

10. The card of claim 7, wherein the electromagnetic signal is a dual polarity drive signal.

11. The card of claim 7, wherein the first data is first magnetic stripe track data of a first magnetic stripe track, and the second data is second magnetic stripe track data of a second magnetic stripe track, the first track different from the second track.

12. A wireless telephonic device comprising the card of claim 7.

13. A card comprising:
a battery;
a processor; and
a dynamic magnetic stripe communications device,
wherein the card is operable to communicate a variable magnitude electromagnetic signal including flux transversals,
at least a plurality of the flux transversals are associated with first data,
at least a plurality of magnitudes of the electromagnetic signal are associated with second data, and
the card is operable to vary a magnitude of the electromagnetic signal between at least three different magnitudes corresponding to three different data states.

14. A method, comprising:
communicating, from a dynamic magnetic stripe communications device, first data and second data using a variable amplitude frequency/double-frequency F2F encoded signal, the F2F encoding being associated to the first data and the variable amplitude being associated to the second data,
wherein the variable amplitude of the signal varies between amplitudes in at least a plurality of amplitude ranges, each amplitude range corresponding to a different data state.

15. The method of claim 14, further comprising:
decoding the signal at a card reader to extract the first data and the second data,
wherein differences in amplitude of the F2F encoded signal are not used to decode the first data.

16. The method of claim 14, further comprising:
generating the signal, at a card, from information including the first data and the second data.

17. The method of claim 16, wherein the card is at least part of a wireless telephonic device.

18. The method of claim 14, wherein the variable amplitude of the signal varies between amplitudes in at least three amplitude ranges, each amplitude range corresponding to a different data state.

19. The method of claim 14, wherein the first data includes at least a portion of first magnetic stripe track data, and
the second data includes at least a portion of second magnetic stripe track data, the first magnetic stripe track data corresponding to a different track from the second magnetic stripe track data.

20. A method comprising:
communicating, from a dynamic magnetic stripe communications device, first data and second data using a variable amplitude frequency/double-frequency F2F encoded signal, the F2F encoding being associated to the first data and the variable amplitude being associated to the second data, and
setting, for at least a plurality of different cards, at least a plurality of different amplitude ranges to communicate different portions of one or more tracks of magnetic stripe data.

* * * * *